3,127,407
CERTAIN 1-(CHLOROPHENYL)-2-TERTIARY
AMINO ALKANES
Ernst Seeger and August Kottler, Biberach an der Riss, Germany, assignors to Dr. Karl Thomae, G.m.b.H., Biberach an der Riss, Germany, a corporation of Germany
No Drawing. Filed Feb. 4, 1960, Ser. No. 6,621
5 Claims. (Cl. 260—293)

This is a continuation-in-part of copending application Serial No. 710,186, filed January 21, 1958, now abandoned.

This invention relates to novel tertiary amines having useful pharmacological properties and to their non-toxic acid addition salts and quaternary compounds.

More particularly, the present invention relates to tertiary amines having the structural formula

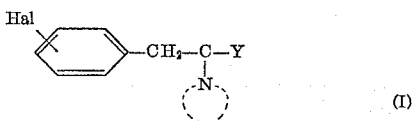
(I)

wherein:
Hal is a halogen having an atomic weight from 35 to 127, inclusive, i.e. chlorine, bromine or iodine,
Y is an alkyl or alkenyl radical with 1 to 10 carbon atoms, and —N is a piperidyl or pyrrolidyl radical, and non-toxic, pharmacologically useful acid addition salts and quaternary compounds.

The tertiary amines having the above structural Formula I may be prepared by various methods, as indicated hereinafter.

One convenient method of preparing the present tertiary amines comprises reacting a cyano compound of the formula

(II)

wherein

Y and —N 

have the meanings defined above, with a halo-benzyl magnesium halide of the formula

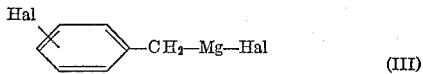
(III)

wherein Hal is a halogen with an atomic weight from 35 to 127, inclusive, i.e. chlorine, bromine or iodine. The reaction between compounds II and III is advantageously carried out in the presence of a suitable organic solvent, such as ether, tetrahydrofuran, benzene, dibutyl ether and the like, or in the presence of mixtures of such solvents, such as a mixture of benzene and tetrahydrofuran. The preferred method consists of refluxing the reaction mixture at the boiling point of the particular solvent employed. However, the reaction will also proceed at moderately elevated temperatures below the boiling point of the solvent and without reflux.

Another convenient method of preparing the tertiary amines according to the present invention comprises reacting a cyano compound of the formula

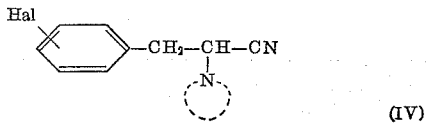
(IV)

wherein

Hal and —N have the meanings defined above, with an organic magnesium halide of the formula Y—Mg—Hal  (V)

wherein Y and Hal have the meanings previously defined, under substantially the same conditions as those described above in connection with the reaction between compounds II and III.

Still another method of preparing the tertiary amines according to the present invention comprises reacting ketones of the formula

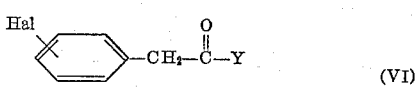
(VI)

wherein Hal and Y have the meanings previously defined, with piperidine or pyrrolidine in the presence of formic acid or its derivatives, or in the presence of nascent or catalytically activated hydrogen.

Finally, the tertiary amines may also be prepared by reacting a primary amine of the formula

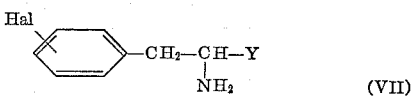
(VII)

wherein Y and Hal have the meanings previously defined, with a 1,4-dihalo-butane or a 1,5-dihalo-pentane in the presence of a compound capable of tying up or neutralizing the hydrogen halide split off during the reaction.

The following examples will illustrate the preparation of various representative compounds of the group defined by Formula I above and will enable others skilled in the art to understand the present invention more completely. It will be understood, however, that the invention is not limited to the particular compounds illustrated in these examples.

EXAMPLE 1

*Preparation of 1-(p-Cloro-Phenyl)-2-Piperidyl-Pentane*

A solution of 16.6 gm. α-piperidyl-butyl cyanide in ether was added dropwise to a Grignard reagent prepared from 4.8 gm. magnesium powder and 32.2 gm. p-chlorobenzyl chloride in ether, accompanied by stirring of the resultant mixture. The reaction mixture was then heated for 1 to 2 hours on a water bath and thereafter acidified with dilute hydrochloric acid. The reaction mixture divided into an aqueous acidic phase and an ethereal phase. The latter was separated and discarded. The aqueous phase was made alkaline with ammonia. An oily substance separated out which was extracted with ether. The ether extract solution was distilled in vacuo. The almost colorless, oily distillation residue, which weighed 16 gm., consisted of a compound having the structural formula

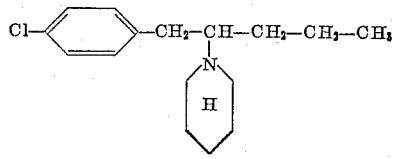

and a boiling point of 124° C. at 0.2 mm. Hg.

The reaction was repeated, except that a mixture of benzene and tetrahydrofuran (1:1) was used as the solvent medium instead of ether. The yield was 15 gm. of 1-(p-chloro-phenyl)-2-piperidyl-pentane.

The hydrochloric acid addition salt of the tertiary amine base was prepared by adding an etheral solution of hydrochloric acid to the base. Upon recrystallization from acetone the 1-(p-chloro-phenyl)-2-piperidyl-pentane hydrochloride had a melting point of 178–179° C.

EXAMPLE 2

*Preparation of 1-(p-Chloro-Phenyl)-2-Pyrrolidyl-Pentane*

Following the procedure described in Example 1, but using 15.2 gm. α-pyrrolidyl-butyl cyanide in place of α-piperidyl-butyl cyanide, 19 gm. of a compound having the structural formula

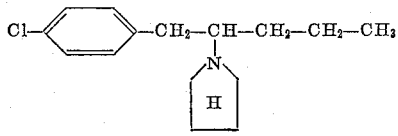

and a boiling point of 123° C. at 0.5 mm. Hg were obtained. Its hydrochloride had a melting point of 126–128° C.

EXAMPLE 3

*Preparation of 1 - (p - Chloro - Phenyl)-2-Pyrrolidyl-4-Methyl-Pentane*

Following the procedure described in Example 1, but using 16.6 gm. α-pyrrolidyl-isoamyl cyanide in place of α-piperidyl-butyl cyanide, 19 gm. of a compound having the structural formula

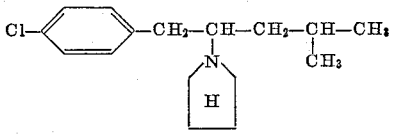

and a boiling point of 120–121° C. at 0.4 mm. Hg were obtained. Its hydrochloride had a melting point of 165–166° C.

EXAMPLE 4

*Preparation of 1 - (-p-Chloro - Phenyl)-2-Pyrrolidyl-3-Methyl-Butane*

Following the procedure described in Example 1, but using 15.2 gm. α-pyrrolidyl-isobutyl cyanide in place of α-piperidyl-butyl cyanide, 19 gm. of a compound having the structural formula

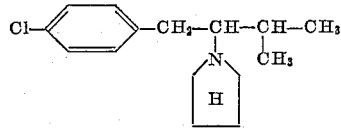

and a boiling point of 115–116° C. at 0.4 mm. Hg were obtained. Its hydrochloride had a melting point of 195° C.

EXAMPLE 5

*Preparation of 1-(p-Chloro-Phenyl)-2-Pyrrolidyl-Hexane*

Following the procedure described in Example 1, but using 16.6 gm. α-pyrrolidyl-amyl cyanide in place of α-piperidyl-butyl cyanide, 21.5 gm. of a compound having the structural formula

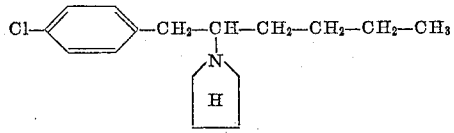

and a boiling point of 130° C. at 0.5 mm. Hg were obtained. Its hydrochloride had a melting point of 114–116° C.

EXAMPLE 6

*Preparation of 1-(p-Chloro-Phenyl)-2-Pyrrolidyl-Octane*

Following the procedure described in Example 1, but using 19.4 gm. α-pyrrolidyl-heptyl cyanide in place of α-piperidyl-butyl cyanide, 23 gm. of a compound having the structural formula

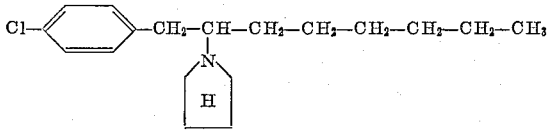

and a boiling point of 138° C. at 0.4 mm. Hg were obtained. Its citrate had a melting point of 117–118° C. upon recrystallization from acetone.

EXAMPLE 7

*Preparation of 1-(p-Chloro-Phenyl)-2-Piperidyl-Propane*

Following the procedure described in Example 1, but using 13.8 gm. α-piperidyl-ethyl-cyanide in place of α-piperidyl-butyl cyanide, 13.5 gm. of a compound having the structural formula

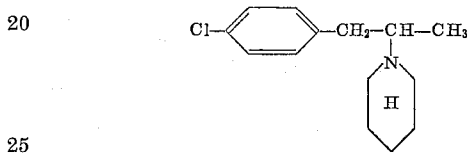

and a boiling point of 125–126° C. at 0.6 mm. Hg were obtained. Its hydrochloride had a melting point of 200–201° C.

EXAMPLE 8

*Preparation of 1-(o-Chloro-Phenyl)-2-Piperidyl-Pentane*

Following the procedure described in Example 1, but using 32.2 gm. o-chloro-benzyl chloride in place of p-chloro-benzyl-chloride, 15 gm. of a colorless liquid compound having the structural formula

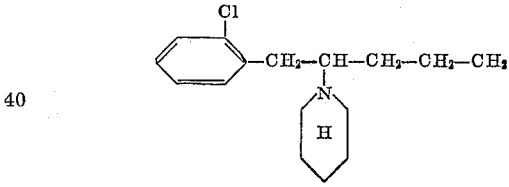

and a boiling point of 122° C. at 0.15 mm. Hg were obtained. Its hydrochloride had a melting point of 168–170° C. after recrystallization from acetone.

EXAMPLE 9

*Preparation of 1-(p-Chloro-Phenyl)-2-Pyrrolidyl-Butane From (p-Chloro-Benzyl)-Ethyl Ketone and Pyrrolidine*

A solution of 9.2 gm. (p-chloro-benzyl)-ethyl ketone and 7 gm. pyrrolidine in 50 cc. anhydrous methanol was prepared. 0.1 gm. platinum oxide was then added to the solution and the mixture was shaken at room temperature in an atmosphere of hydrogen at a pressure of about 43 p.s.i. gauge. After the hydrogenation reaction had gone to completion the platinum oxide catalyst was filtered off and the filtrate was evaporated. The evaporation residue was then dissolved in dilute hydrochloric acid. To remove impurities, the acid solution was extracted with ether and the ether extract was discarded. The aqueous acid solution was then made alkaline with dilute sodium hydroxide, whereby a precipitate formed which was filtered off and taken up in ether. The ether was evaporated, leaving behind a compound having the structural formula

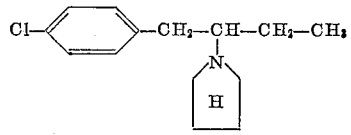

After purification by distillation the reaction product had a boiling point of 122° C. at 0.6 mm. Hg. Its hydrochloride had a melting point of 141° C. upon recrystallization from acetone.

EXAMPLE 10

*Preparation of 1-(p-Chloro-Phenyl)-2-Piperidyl-Pentane From (p-Chloro-Benzyl)-Propyl Ketone and Piperidine*

A solution of 19.8 gm. (p-chloro-benzyl)-propyl ketone and 15 gm. piperidine in 100 cc. anhydrous ethanol was prepared, and 0.15 gm. platinum oxide was added to the solution. The mixture was then placed into a vibrating autoclave and heated therein in an atmosphere of hydrogen at a temperature of 200° C. and a pressure of 180 atmospheres. After the hydrogenation had gone to completion the platinum oxide catalyst was filtered off and the filtrate was distilled to remove the ethanol solvent. The distillation residue was dissolved in dilute hydrochloric acid. The aqueous acid solution was then extracted with ether to remove impurities and the ether extract was discarded. The aqueous acid solution was made alkaline with a 10% solution of sodium hydroxide, whereby a precipitate formed which was extracted with ether. The ether was removed from the ether extract solution by evaporation, leaving behind 4.5 gm. of a compound having the structural formula

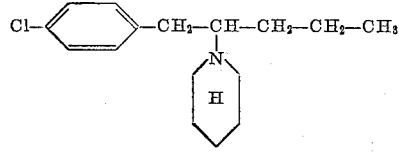

and a boiling point of 124° C. at 0.2 mm. Hg. Its hydrochloride had a melting point of 178–179° C. upon recrystallization from acetone.

EXAMPLE 11

*Preparation of 1-(p-Chloro-Phenyl)-2-Pyrrolidyl-Pentane From (p-Chloro-Benzyl)-Proypl Ketone and Pyrrolidine in the Presence of Formic Acid*

28.4 gm. pyrrolidine were placed into a flask provided with a descending condenser. 18.4 gm. anhydrous formic acid were then added dropwise to the pyrrolidine. The resulting mixture was heated slowly to 170° C. The water formed by the reaction distilled off and was withdrawn from the condenser. The mixture in the flask was allowed to cool. Thereafter, 19.8 gm. (p-chlorobenzyl)-propyl ketone, 4.6 gm. formic acid and 2 gm. MgCl$_2$—6H$_2$O were added and the resulting mixture was heated for about 5 hours on an oil bath at 180–190° C. until no further liquid distilled over. The reaction mixture remaining in the flask was acidified with dilute hydrochloric acid and then extracted with ether. The ether extract solution was discarded, while the aqueous acid solution was made alkaline with dilute NaOH. A precipitate formed which was taken up in ether. The ether solution was separated and heated to remove the ether solvent. The residue was distilled, yielding 12 gm. of a compound having the structural formula

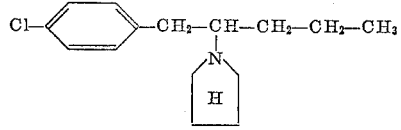

and a boiling point of 123° C. at 0.5 mm. Hg. Its hydrochloride had a melting point of 126° C. upon recrystallization from acetone.

EXAMPLE 12

*Preparation of 1-(p-Chloro-Phenyl)-2-Piperidyl-Pentane From 1-(p-Chloro-Phenyl)-2-Amino-Pentane and 1,5-Dibromo-Pentane in the Presence of Sodium Acetate*

A solution of 3 gm. 1-(p-chloro-phenyl)-2-amino-penane, 2.5 gm. 1,5-dibromo-pentane and 1 gm. sodium acetate in 20 cc. isopropanol was refluxed for three hours. The isopropanol solvent was then removed from the reaction mixture by distillation and the residue was acidified with dilute hydrochloric acid. The resulting acid solution was extracted with ether and the ether extract was discarded. The aqueous acid solution remaining was made alkaline with dilute NaOH, whereby a precipitate formed which was taken up in ether. The ether solution was distilled in vacuo to remove the ether, leaving behind 1.5 gm. of a compound having the structural formula

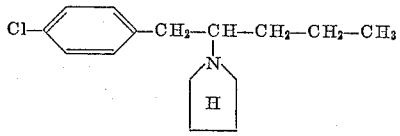

Its hydrochloride had a melting point of 178° C.

EXAMPLE 13

*Preparation of 5-(o-Chloro-Phenyl)-2-Pyrrolidyl-Pentane*

Following the procedure described in Example 1, but using 15.2 gm. α-pyrrolidyl-butyl cyanide in place of α-piperidyl-butyl cyanide, and 32.2 gm. o-chloro-benzyl chloride in place of p-chloro-benzyl chloride, 14 gm. of a compound having the structural formula

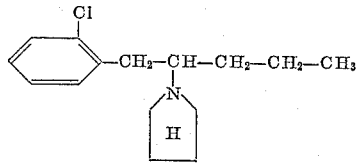

and a boiling point of 112° C. at 0.25 mm. Hg were obtained.

EXAMPLE 14

*Preparation of 1-(p-Chloro-Phenyl)-2-Pyrrolidyl-Pentane Benzylobromide*

7.5 gm. 1-(p-chloro-phenyl)-2-pyrrolidyl-pentane were dissolved in 50 cc. acetone and the resulting solution was heated for 3 hours to about 60° C. with 6.8 gm. benzyl bromide. The quaternary ammonium compound having the structural formula

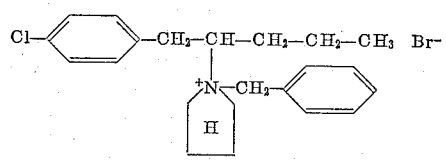

started to crystallize out during heating. The crystals were filtered off on a vacuum filter, washed with ether and recrystallized from methanol. 9.5 gm. of colorless crystals having a melting point of 170–171° C. were obtained.

EXAMPLE 15

*Preparation of 1-(p-Chloro-Phenyl)-2-Pyrrolidyl-Pentane Methobromide*

7.5 gm. 1-(p-chloro-phenyl)-2-pyrrolidyl-pentane and 4.7 gm. methyl bromide were dissolved in 50 cc. acetone and the resulting solution was heated in a sealed tube for one hour to about 60° C. The quaternary ammonium compound having the structural formula

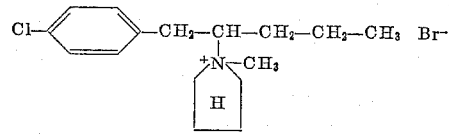

was filtered off on a vacuum filter and recrystallized from methyl-ethyl ketone. 9 gm. of colorless crystals having a melting point of 193° C. were obtained.

EXAMPLE 16

*Preparation of 1-(p-Chloro-Phenyl)-2-Pyrrolidyl-Pentene-(3)*

14 gm. α-pyrrolidyl-pentene-(2) cyanide were dissolved in dry ether, and the resulting solution was added dropwise to a Grignard reagent prepared from 3.6 gm. magnesium powder and 24.2 gm. p-chloro-benzyl chloride in dry ether, accompanied by stirring the resulting mixture. The reaction mixture was then heated for one hour to about 30° C. and was worked up following the procedure of Example 1. 12 gm. of a compound having the structural formula

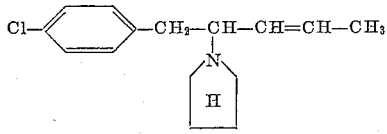

and a boiling point of 126–129° C. at 0.5 mm. Hg were obtained.

EXAMPLE 17

*Preparation of 1-(p-Chloro-Phenyl)-2-Pyrrolidyl-Undecane*

A solution of 23.6 gm. α-pyrrolidyl-decyl cyanide in ether was added dropwise to a Grignard reagent prepared from 3.6 gm. magnesium powder and 24.2 gm. p-chloro-benzyl-chloride in dry ether, accompanied by stirring the resulting mixture. The reaction mixture was then refluxed for one hour on a water bath while continuing to stir. After allowing to cool and adding ice, the reaction mixture was decomposed by adding dilute hydrochlorid acid and ammonium chloride. An ethereal phase and an aqueous phase formed. After rendering alkaline with aqueous ammonia, the ethereal phase was separated, dried over sodium sulfate and then distilled to drive off the ether. The oily residue was then distilled in vacuo, yielding 20 gm. of a compound having the structural formula

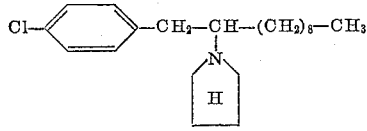

and a boiling point of 197–198° C. at 0.2 mm. Hg.

As previously stated and illustrated in the preceding examples, the tertiary amines of the present invention are in many cases water-insoluble oils. It is, therefore, often convenient to use them pharmacologically and therapeutically as the more water-soluble acid addition salts derived from non-toxic inorganic or organic acids or in the form of quaternary ammonium salts derived from alkyl, aralkyl or cycloalkyl halogenides, dialkyl sulfates or p-toluene sulfonic acid alkyl esters.

Typical examples of pharmacologically useful non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like. The hydrochlorides, however, have been found to be particularly suitable for practical purposes.

Typical examples of pharmacologically useful, non-toxic quaternary compounds of the present tertiary amines are those formed with methyl iodide, methyl bromide, benzyl bromide, ethyl iodide, isobutyl bromide and other alkyl chlorides, bromides or iodides, dimethyl sulfate, diethyl sulfate, p-toluene sulfonic acid alkyl esters, cyclohexyl chlorides, bromides or iodides, cyclopentyl chlorides, bromides or iodides, and the like, in accordance with customary quaternizing procedures such as those illustrated in the preceding examples.

The tertiary amines embraced by Formula I above are useful and effective pharmacological agents. More particularly, they exhibit hypertensive properties as well as a stimulating effect upon the central nervous system. Moreover, they are substantially less toxic than tertiary amines of similar structure.

Thus, intravenous injection of 2 mgm./kg. of 1-(p-chlorophenyl)-2-piperidyl-pentane hydrochloride in cats produced an increase in the blood pressure of 30 to 80 mm. Hg. The subcutaneous $LD_{50}$ of this compound in mice was found to be 839 mgm./kg. In contrast thereto, the subcutaneous $LD_{50}$ of 1-phenyl-2-piperidyl-pentane hydrochloride is 247 mgm./kg. Hence the toxicity of the halogen-substituted compound according to the invention is about ⅓ of the toxicity of the related compound which lacks the halogen substituent.

Similarly, in vivo tests on cats and dogs showed that intravenous injection of 2 mgm./kg. of 1-(p-chloro-phenyl)-2-pyrrolidyl-pentane hydrochloride produced an increase in the blood pressure of 20 to 60 mm. Hg. Furthermore, using the test method described by Schlaginweit, Archiv. exper. Path. und Pharmakol., vol. 131, page 212 (1929), it was found that this compound produced a stimulating effect upon the central nervous system of rats which was 30 times stronger than that produced by an equal dose of caffeine.

The subcutaneous $LD_{50}$ of 1-(p-chloro-phenyl)-2-pyrrolidyl-pentane hydrochloride in mice was determined to be 130 mgm./kg., whereas the subcutaneous $LD_{50}$ of the related unsubstituted tertiary amine 1-phenyl-2-pyrrolidyl-pentane hydrochloride is 99 mgm./kg. body weight.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:
1. 1-(p-chloro-phenyl)-2-piperidino-pentane.
2. 1-(p-chloro-phenyl)-2-pyrrolidino-pentane.
3. 1-(p-chloro-phenyl)-2-pyrrolidino-butane.
4. 1-(o-chloro-phenyl)-2-piperidino-pentane.
5. 1-(o-chloro-phenyl)-2-pyrrolidino-pentane.

References Cited in the file of this patent

UNITED STATES PATENTS

| | | |
|---|---|---|
| 2,711,428 | Goodson et al. | Jan. 21, 1955 |
| 2,824,111 | Heinzelman | Feb. 18, 1958 |

FOREIGN PATENTS

| | | |
|---|---|---|
| 191,869 | Austria | Sept. 25, 1957 |
| 533,541 | Canada | Nov. 20, 1956 |
| 1,029,004 | Germany | Apr. 30, 1958 |
| 113,372 | Sweden | Mar. 6, 1945 |
| 268,094 | Switzerland | Aug. 1, 1950 |

OTHER REFERENCES

Stevens: J. Chem. Soc. (1931), page 2568.
Adamson: J. Chem. Soc. (1951), page 59.
Beilstein: Vol. 20, 2nd supplement (1953): page 16, System No. [3038].
Heinzelman et al.: J. Amer. Chem. Soc., vol. 75: 3410 (1953).
Kadatz et al.: Arzneimittel Forschung, vol. 6: page 345 (1957).